United States Patent

Argiolas

[11] Patent Number: 5,815,151
[45] Date of Patent: Sep. 29, 1998

[54] GRAPHICAL USER INTERFACE

[75] Inventor: Andrea Argiolas, Cagliari, Italy

[73] Assignee: International Business Machines Corp., Armonk, N.Y.

[21] Appl. No.: 778,318

[22] Filed: Jan. 2, 1997

[30] Foreign Application Priority Data

Mar. 8, 1996 [GB] United Kingdom .................... 9605007

[51] Int. Cl.$^6$ ........................................................ G06F 3/00
[52] U.S. Cl. ............................................................ 345/342
[58] Field of Search ...................................... 345/340, 342

[56] References Cited

U.S. PATENT DOCUMENTS

| | | |
|---|---|---|
| 5,227,771 | 7/1993 | Kerr et al. |
| 5,561,757 | 10/1996 | Southgate. |
| 5,666,498 | 9/1997 | Amro. |
| 5,675,755 | 10/1997 | Trueblood. |
| 5,751,283 | 5/1998 | Smith. |

FOREIGN PATENT DOCUMENTS 62-276672  12/1987  Japan.

*Primary Examiner*—A. Katbab
*Attorney, Agent, or Firm*—Daniel E. McConnell

[57] ABSTRACT

In a graphical user interface, a method for resizing the windows which allows to immediatly focalize on the desired part of the displayed image. The final image displayed in the window strictly depends on the way the window has been resized by the user.

2 Claims, 4 Drawing Sheets

GRAPHICAL USER INTERFACE

TECHNICAL FIELD

The present invention relates to a graphical user interface and particularly to a method and system for resizing windows.

BACKGROUND ART

Data processing systems are usually provided with a graphical user interface (GUI) to allow a user to control the data processing system and to present the results of user actions on the system display. In a graphical user interface, applications and data are generally presented as objects depicted on a user interface. A user is then provided with a graphical, intuitive interface to a complex data processing system which permits graphic selection of depicted objects and manipulation of applications corresponding to those objects.

It is usually possible to simultaneously execute several software applications. The execution of multiple applications simultaneously is often referred to as "multitasking". It is desirable in such environments to allow the user to view some or all of the applications simultaneously. This is often accomplished by the utilization of the concept of "windows" wherein all or part of multiple applications are displayed in separate viewports of a computer system video display system. It is known to have multiple software applications present on a computer display simultaneously, one or more of which may be active at any given time, and which may be displayed in a window or icon.

There may be several windows simultaneously present on the desktop with each window displaying information that is generated by a different application program. Each application program presents information to the user through its window by drawing images, graphics or text within the window region. The user, in turn, communicates with the application by pointing at graphical objects in the window with a pointer that is controlled by a pointing device, such as a mouse, and then selecting the objects, or by typing information via a keyboard associated with the monitor. Selection of the objects may be effected by actuating the mouse to move the pointer onto or near the objects and pressing and quickly releasing, i.e. clicking, a button on the mouse, or by manipulating a cursor via the keyboard.

These user interface objects may be easily manipulated utilizing a standard set of interface commands. For example, the user may move the windows around on the display screen, change their sizes and appearances, shrink down a window to a so-called icon, rearrange the objects with respect to their relative background/foreground position so as to arrange the desktop in a convenient manner, etc.

There are a number of different graphical user interface environments commercially available which utilize the arrangement described above. These environments include the System 7 operating system developed by Apple Computer, Inc. (System 7 is a trademark of Apple Computer, Inc.), the Windows graphical user interface developed by the Microsoft Corporation (Windows is a trademark of Microsoft Corporation) and the OS/2 Presentation Manager developed by International Business Machines Corporation (OS/2 and Presentation Manager are trademarks of International Business Machines Corporation).

As mentioned above one of the possible operations a user can perform on a window is to change its size. This is usually accomplished by placing the cursor, using the mouse or any pointer device, on a side or on a corner of the window and moving the side or the corner of the window causing the window to resize accordingly.

Usually when a window (e.g. containing an image) is resized, the resulting image area still visible does not depend on the way and direction the window was resized, but only on the final size of the window. The most common method used to render a partial image inside a resized window leaves the top left corner of the image always visible, hiding the right and/or bottom areas if the image does not fit the new size. This means that when the image does not fit the image size and the user wants to see or to operate on the hidden part of image he has to use the window scroll bars to reach the desired image area.

SUMMARY OF THE INVENTION

It is an object of the present invention to provide a technique which alleviates the above drawbacks.

According to the invention we provide, in a graphical user interface for graphically displaying a plurality of windows on a display area, having a cursor movable on the display area via a pointing device, a method for resizing a window, comprising the following steps:

associating a part of the border of the window with the cursor;

moving that part of the border by moving the cursor on the display area, thereby effecting a change in the size of the windows; characterized in that the portion of the window which is not affected by the resizing contains, after the resizing, the same portion of the image contained before the resizing.

Furthermore, according to the present invention we provide, a data processing system, having a graphical user interface for displaying on a display area a plurality of windows, comprising:

a cursor movable on the display area;

pointing means for moving the cursor on the display area;

means for associating a part of the border of a window with the cursor;

means for resizing the window by moving the cursor on the display area; characterized in that the portion of the window which is not affected by the resizing contains, after the resizing, the same portion of the image contained before the resizing.

It should be noted that the word image used above is intended to include any kind of image, not only the graphical ones, which can be displayed on a window (e.g. text).

BRIEF DESCRIPTION OF THE DRAWINGS

Various embodiments of the invention will now be described in detail by way of examples, with reference to accompanying figures, where.

DETAILED DESCRIPTION OF THE PREFERRED EMBODIMENT

Figure 1:
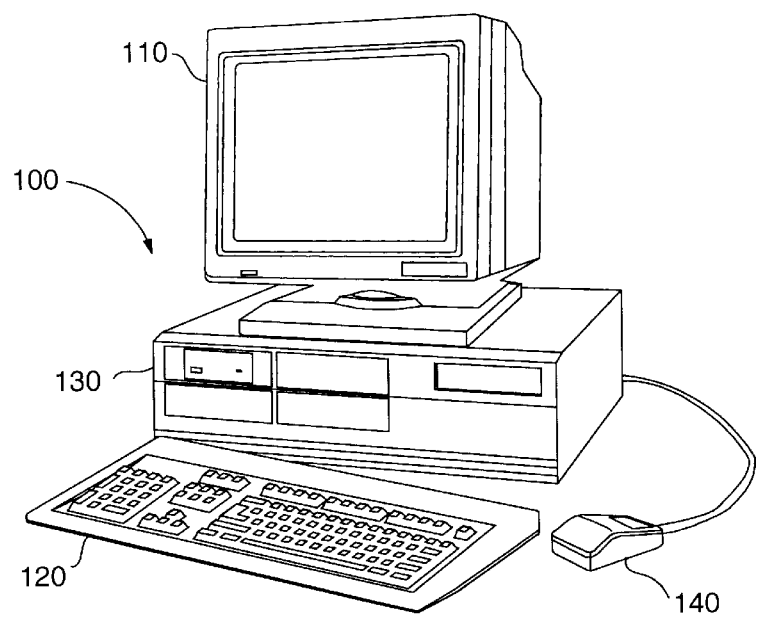
FIG. 1 shows schematically a computer which may be utilized to implement the method and system of the present invention.

With reference to FIG. 1, there is depicted a computer 100 which may be utilized to implement the method and system of the present invention. The computer 100 preferably includes a display unit 110 and a keyboard 120, coupled in a manner well known in the art. Additionally, the computer 100 includes a processor system unit 130 which may serve to mount a fixed disk drive and a diskette drive in addition to the main processor and memory. Further, in order to facilitate the utilization of a graphical user interface, computer 100 preferably includes a graphic pointing device, such as a mouse 140, which may be utilized to manipulate the position of a pointer (not shown) within a visual display on the screen 110. Those skilled in the art will appreciate that computer 100 may be implemented utilizing any state-of-the-art personal computer, such as the PS/2 Personal Computer manufactured by International Business Machines Corporation. (PS/2 is a trademark of International Business Machines Corporation).

Figure 2:
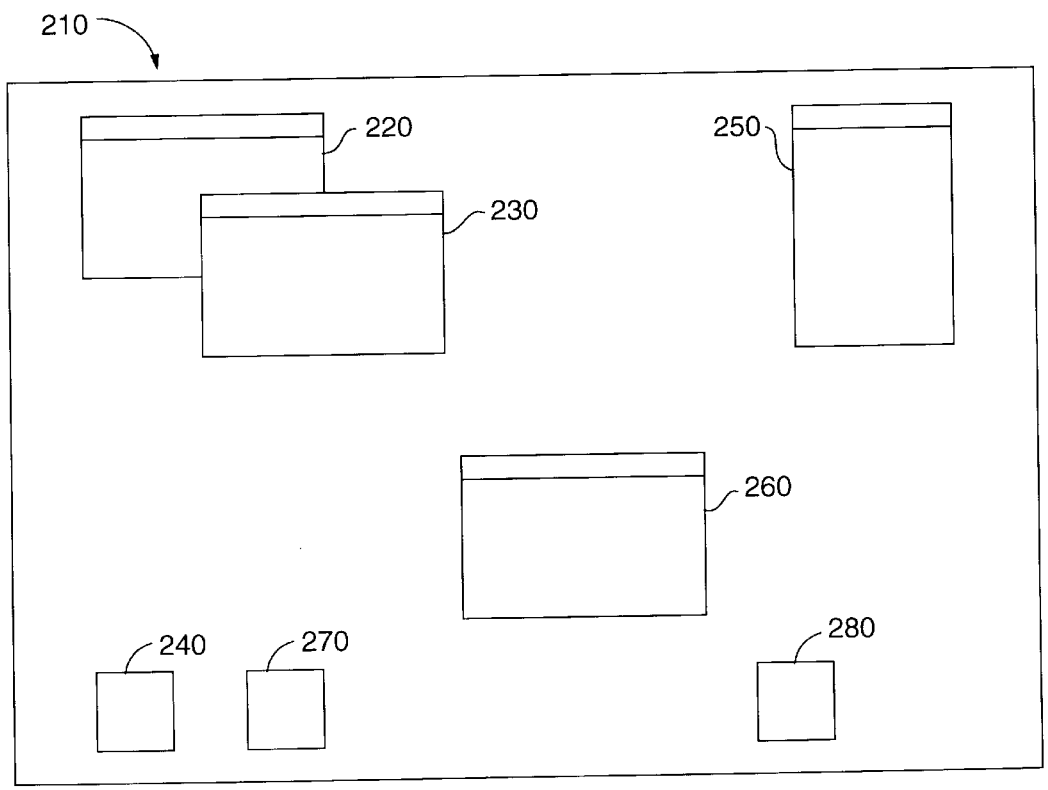
FIG. 2 shows schematically a graphical user interface of the type used in the preferred embodiments of the present invention.

With regard now to FIG. 2, a graphical user interface which may be utilized to implement the method and system of the present invention is shown. The graphical display is typically arranged to resemble a single desktop 210. Execution of an application program involves one or more user interface objects represented by windows 220, 230 and icons 240. Typically, there may be several other windows 250, 260 and icons 270, 280 simultaneously present on the desktop and displaying information that is generated by different applications.

The window environment is generally part of the operating system software that includes a collection of utility programs for controlling the operation of the computer system 100. The operating system, in turn, interacts with application programs to provide higher level functionality, including a direct interface with the user. Specifically, the application programs make use of operating system functions by issuing task commands to the operating system which then performs the requested task. For example, an application program may request that the operating system display certain information on the window 220 for presentation to the user.

According to the preferred embodiment of the present invention the method for resizing a window is based on keeping a stable focus on the image. It consists in using the capability of dragging with the mouse (or any other kind of device capable of moving the cursor on the desktop) a point on the border of the window and moving the border toward the direction desired, keeping the client area stable in the original position and then showing (or hiding) the portion of the image within the area made visible (or hidden) by the movement of the window border.

According to the present invention the part of image still visible in the resized window strictly depends on the way the window has been resized. In fact, if the left side of the window is desired be kept on the screen, the resizing of the window can be made by moving the right border. Vice-versa, if the right area should remain visible in the resized window, the resizing can be made by moving the left border.

The same approach will be used for top and bottom borders or when the resizing of the window is made by dragging and moving one of the corners.

With the known resizing tools the top left corner of the image stays stuck to the top left corner of the window regardless of which side or the corner is moved.

Figure 3A:
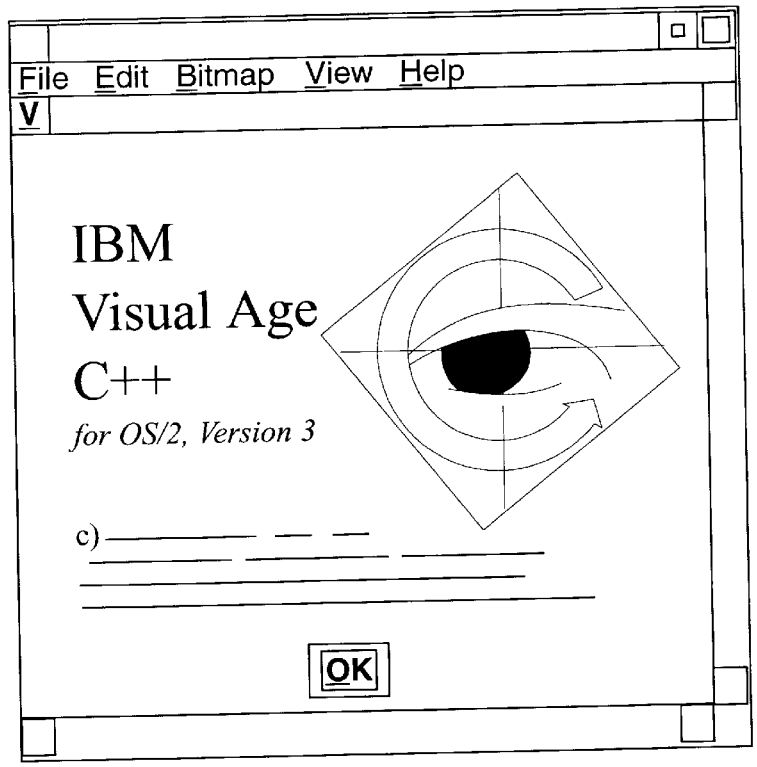
FIGS. 3a and 3b are is a schematic example of the way the prior art techniques operate.
Figure 3B:
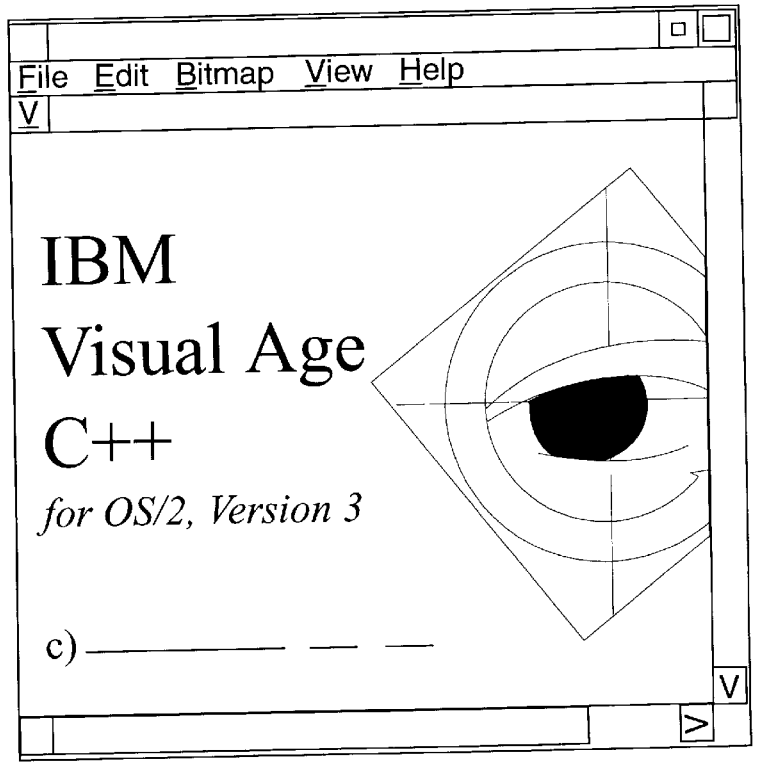

FIGS. 3a and 3b show shows an example of window resizing using the prior art technique. Let's suppose we need to reduce the size of the window from the size of FIG. 3a to the one of FIG. 3b. We also need to have the bottom right corner of the image displayed on the resized window. Even if we drag and move the top left corner, the resized window will show on the top left corner the original top left part of the image, hiding the bottom right portion. So we need now operate on the scroll bars (301, 303) to obtain the image we need.

Figure 4A:
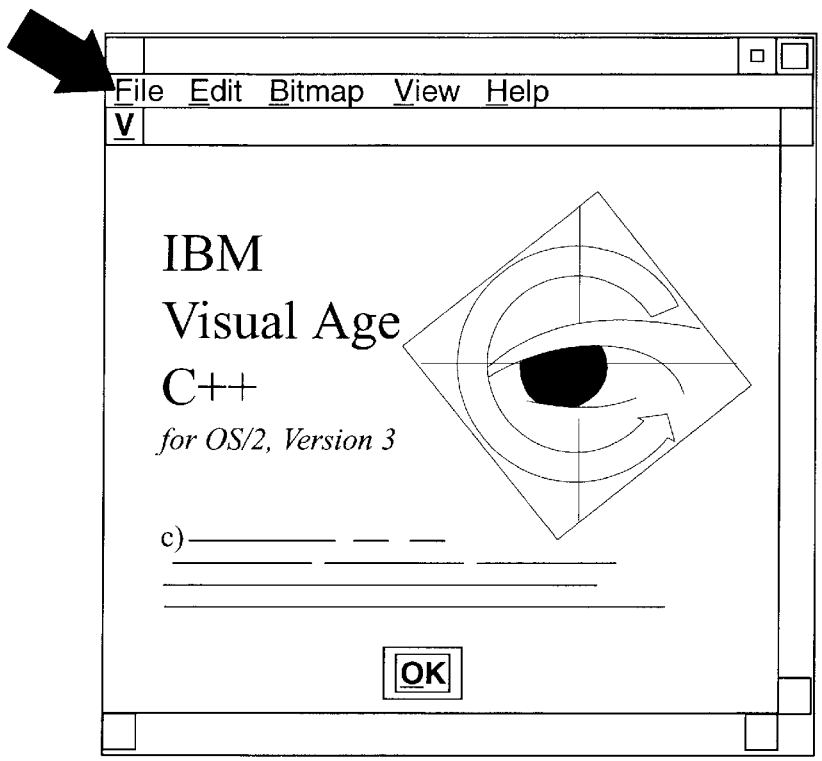
FIGS. 4a and 4b are is a schematic example of the way the method according to the preferred embodiments of the present invention operates.
Figure 4B:
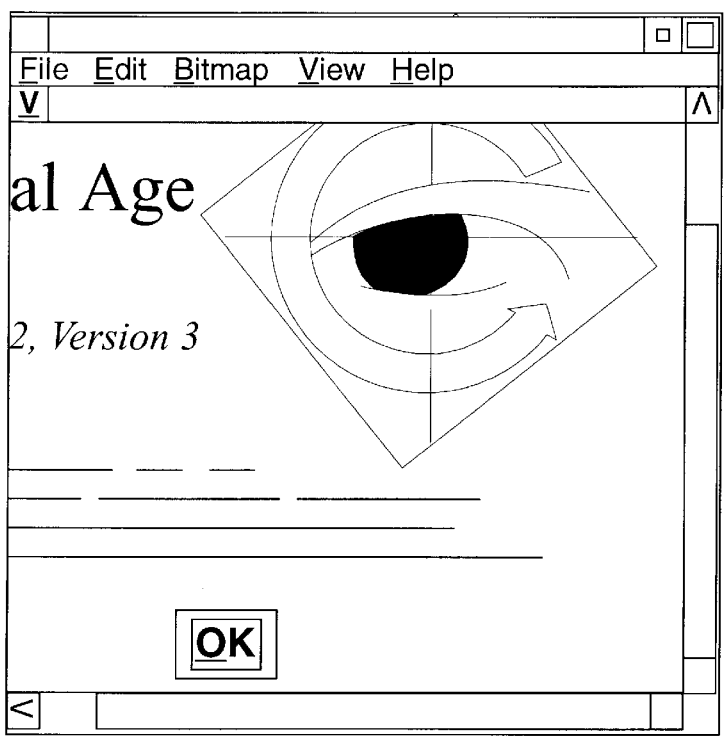

According to the method proposed by the present invention we could obtain the same result with only one operation. As shown in FIGS. 4a and 4b show we could resize the window "covering" the portion of image we do not need by dragging and moving the top left border. The portion of window which was not affected by the resizing still contains the same portion of image as before the resizing.

Figure 5:
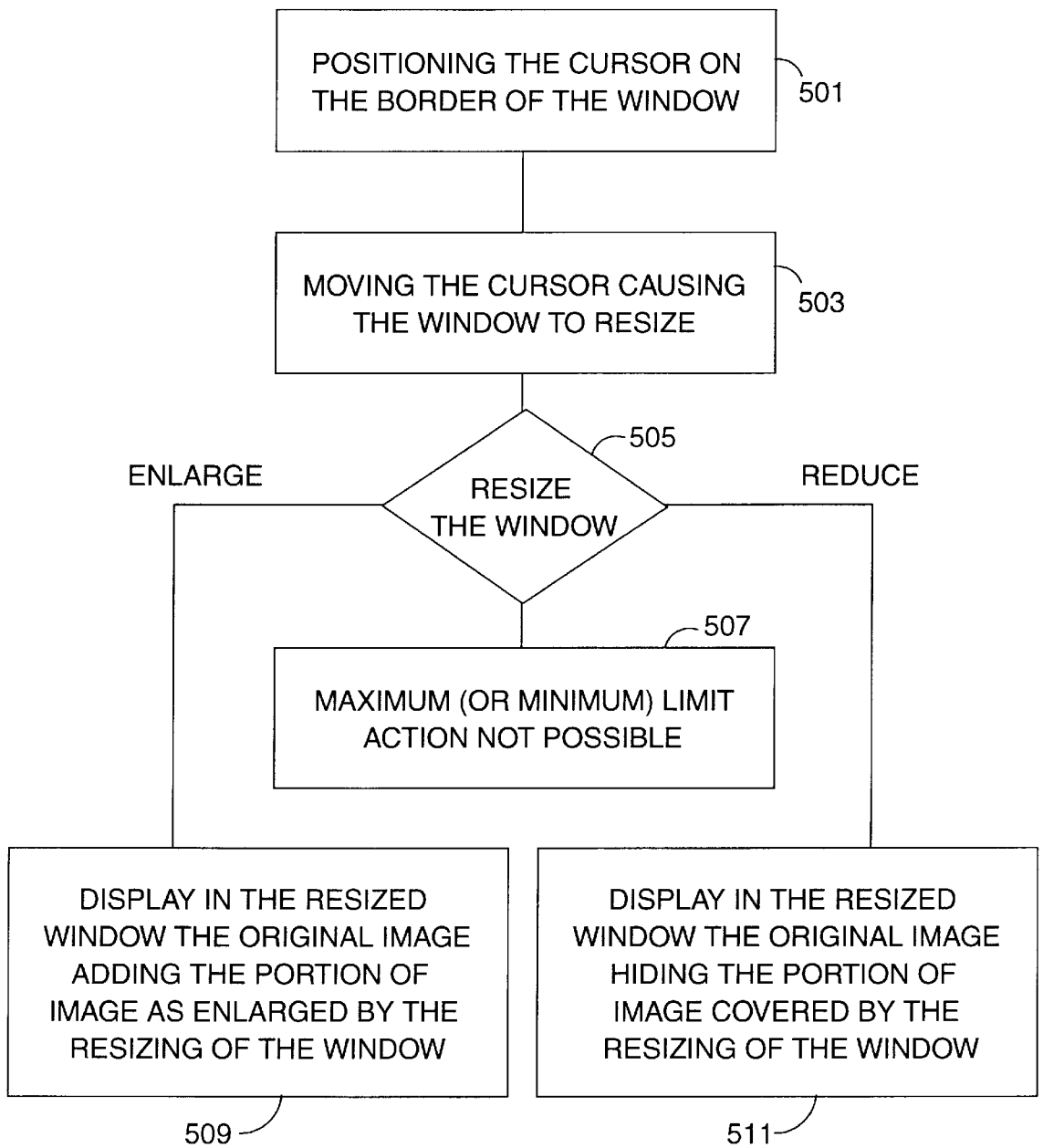
FIG. 5 is a schematic flow diagram of the method according to the preferred embodiments of the present invention.

In FIG. 5 a flow diagram with the steps of the resizing method is shown.

With step 501 the cursor is positioned by the user with a mouse or any other pointing system on the border of a window. It could be either a corner or a side. It is common in the graphical user interface to provide a function (usually clicking on the mouse) that cause the graphical element pointed by the cursor to be dragged by the movement of the cursor itself. In the case of a window, by dragging a border the window changes its size and shape according to which part of the border is dragged and in which direction (step 503).

The step 505 recognizes which kind of resizing shall be done on the window. If for example, the top side is moved downward, then the window will be reduced in height and the final window will have the right and left sides shorter than the original one. In case the window already reached its maximum size (in that direction) and an enlargment is tried (or the minimum size is reached and a reducing is tried) of course no resizing is performed (507).

If the required resizing action was an enlargement than the process goes to step 509 which displays the original image (without changing its position) and adding the portion of image as enlarged by the movement of the borders.

Otherwise, if the resizing involve a reduction of the window, step 511 displays the original image hiding the portion of the image covered by the movement of borders.

Thus, by dragging the window border, the user can reach directly the desired portion of image or can reduce the displayed image, hiding the undesired portion of the image. The number of operations is reduced, because there is no longer a need to adjust the image with the scroll function after resizing the window.

I claim:

1. A method comprising:
    displaying graphical information in a client area of a window defined in a position within a computer driven display, the window being bounded by a border;
    displaying a cursor on the computer driven display, the position of the cursor being controlled by manipulation of a pointing device;
    keeping the graphical information displayed in the client area stable in its original position within the computer driven display and anchoring the graphical information to a corner of the client area;
    associating the cursor with a point on the border of the window opposite to the anchor corner; and
    manipulating the pointing device to move the portions of the border which intersect the point to change the size of the client area while retaining the stabilized graphical information display anchored to the corner of the client area position notwithstanding changes in the size thereof;

whereby portions of the graphical information toward the moved side of the client area are shown or hidden from view in the client area as the size thereof changes.

2. A computer system comprising:

a display;

processor elements coupled to and driving the display to display thereon a window bounded by a border, graphical information displayed in a client area of the window, and a cursor the position of which is controlled by manipulation of a pointing device; and a display control program stored accessibly to and exercised by the processor elements to keep the graphical information displayed in the client area stable in its original position within the computer driven display and anchor the graphical information to a corner of the client area; associate the cursor with a point on the border of the window opposite to the corner; and, in response to manipulation of the pointing device, move the portions of the border which intersect the point to change the size of the client area while retaining the stabilized graphical information display anchored to the corner of the client area position notwithstanding changes in the size of the client area;

whereby portions of the graphical information toward the moved side of the client area are shown or hidden from view in the client area as the size thereof changes.

* * * * *